(12) United States Patent
Fujiwara et al.

(10) Patent No.: US 11,316,599 B2
(45) Date of Patent: Apr. 26, 2022

(54) MOBILE TERMINAL TESTING DEVICE AND INTERFERENCE STATE SIMULATING METHOD THEREOF

(71) Applicant: ANRITSU CORPORATION, Kanagawa (JP)

(72) Inventors: Tomoyuki Fujiwara, Kanagawa (JP); Akihiko Suenaga, Kanagawa (JP); Toshiaki Aoki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 56 days.

(21) Appl. No.: 16/587,762

(22) Filed: Sep. 30, 2019

(65) Prior Publication Data

US 2020/0127746 A1 Apr. 23, 2020

(30) Foreign Application Priority Data

Oct. 17, 2018 (JP) .............................. JP2018-195871

(51) Int. Cl.
| | |
|---|---|
| *H04B 17/345* | (2015.01) |
| *H04B 17/00* | (2015.01) |
| *H04B 7/0452* | (2017.01) |
| *H04W 80/08* | (2009.01) |
| *H04W 72/08* | (2009.01) |
| *H04W 76/27* | (2018.01) |
| *H04W 80/02* | (2009.01) |
| *H04B 7/024* | (2017.01) |

(52) U.S. Cl.
CPC .......... *H04B 17/345* (2015.01); *H04B 7/024* (2013.01); *H04B 7/0452* (2013.01); *H04B 17/0085* (2013.01); *H04W 72/082* (2013.01); *H04W 76/27* (2018.02); *H04W 80/02* (2013.01); *H04W 80/08* (2013.01)

(58) Field of Classification Search
CPC .. H04B 7/024; H04B 7/0452; H04B 17/0085; H04B 17/345; H04W 72/082; H04W 76/27; H04W 80/02; H04W 80/08
See application file for complete search history.

(56) References Cited

U.S. PATENT DOCUMENTS

| | | | |
|---|---|---|---|
| 2004/0193985 A1* | 9/2004 | Bhora ................ | G01R 31/3187 714/733 |
| 2010/0131751 A1* | 5/2010 | Reznik .............. | H04W 12/1206 713/151 |
| 2016/0286422 A1 | 9/2016 | Samejima et al. | |

* cited by examiner

*Primary Examiner* — Rhonda L Murphy
(74) *Attorney, Agent, or Firm* — Pearne & Gordon LLP

(57) ABSTRACT

A mobile terminal testing device includes a layer processing unit 3 that communicates with a mobile terminal 10 by performing processing of each layer of a layer-configured communication protocol with a plurality of layers, in which the layer processing unit 3 includes a PHY processing unit 31 that performs multiplexing, channel coding, or the like in order to transmit and receive communication data transmitted to and received from the mobile terminal 10, in which the PHY processing unit 31 transmits a dummy signal, by omitting higher processing from predetermined processing, for an interference signal in multi user-multi input multi output (MU-MIMO) multiplex signals, in a case of testing MU-MIMO terminal-to-terminal interference.

8 Claims, 3 Drawing Sheets

MOBILE TERMINAL TESTING DEVICE AND INTERFERENCE STATE SIMULATING METHOD THEREOF

TECHNICAL FIELD

The present invention relates to a mobile terminal testing device which communicates with a mobile communication terminal in order to test the mobile communication terminal.

BACKGROUND ART

In a case of developing the mobile terminal performing communication while moving a mobile phone or a data communication terminal, it is necessary to test whether or not the developed mobile terminal can normally perform communication. Therefore, a testing device which operates as a pseudo base station simulating a function of an actual base station is connected to a mobile terminal to be tested, communication is performed between the testing device and the mobile terminal, and a test of checking the contents of the communication is performed.

such as long term evolution-advanced (LTE-A), a multi-input multi-output (MIMO) system has been proposed in which in order to improve the communication rate, both a base station and a mobile communication terminal have a plurality of antennas, signals are simultaneously transmitted in the same frequency band (hereinafter referred to as "cell") from the plurality of antennas, and the signals are received and separated by the plurality of antennas.

Further, multi-user-MIMO (MU-MIMO) is proposed in which communication is performed at the same frequency by a plurality of antennas between a base station and a plurality of mobile communication terminals by developing MIMO technology.

Patent Document 1, in a test of MU-MIMO, in a case of simulating a state where radio waves of a plurality of mobile communication terminals interfere, using a plurality of cells of a mobile terminal testing device, interfered cells and interfering cells are initialized based on parameters of the interfered cells and parameters of the interfering cells created from the parameters of the interfered cells, and an interference state is simulated adjusting output levels of signals of the interfered cells and the interfering cells and synthesizing cells.

RELATED ART DOCUMENT

Patent Document

[Patent Document 1] US 2016/0286422 A1

DISCLOSURE OF THE INVENTION

Problem that the Invention is to Solve

However, in such a mobile terminal testing device, since parameters of interfering cells are created from parameters of interfered cells and the interfering cells are initialized based on the parameters of interfering cells, when the number of layers (the number of streams) of the interference signals increases, the number of cells increases, which causes a problem that the processing load of the mobile terminal testing device increases.

Thus, an object of the present invention is to provide a mobile terminal testing device capable of reducing a processing load even if the number of layers of an interference signal increases, by eliminating the creation of parameters of an interfering cell and the processing of the interfering cell.

Means for Solving the Problem

A mobile terminal testing device of the present invention is a mobile terminal testing device which tests a mobile terminal by simulating a base station of mobile communication, including a layer processing unit that communicates with the mobile terminal according to a communication protocol with a plurality of layers, wherein the layer processing unit transmits a dummy signal generated by omitting higher processing from predetermined processing, for an interference signal in multi user-multi input multi output (MU-MIMO) multiplex signals, in a case of testing MU-MIMO terminal-to-terminal interference.

With this configuration, for the interference signal in MU-MIMO multiplex signals, the dummy signal generated by omitting higher processing from predetermined processing is transmitted. Thus, the creation of parameters of the interference signal and the processing of the interfering cell can be omitted, and the processing load can be reduced even when the number of layers of the interference signal increases.

Further, in the mobile terminal testing device of the present invention, the layer processing unit may set whether or not to transmit the dummy signal, for each of the MU-MIMO multiplex signals.

With this configuration, it is possible to set whether or not to transmit a dummy signal, for each of the MU-MIMO multiplex signals. Thus, the number of layers of the interference signal can be easily increased or decreased, and the interference state can be easily set.

In the mobile terminal testing device of the present invention, the layer processing unit may set a parameter of processing lower than the omitted processing, for the MU-MIMO multiplex signals which are set to transmit the dummy signal.

With this configuration, a parameter of processing lower than the omitted processing can be set, for the MU-MIMO multiplex signals which are set to transmit the dummy signal. Therefore, the parameters of the signal to be transmitted can be changed and the interference state can be easily set.

In the mobile terminal testing device according to the present invention, the higher processing from the predetermined processing may be one or a plurality of processing higher than channel coding.

With this configuration, the creation of parameters of the interference signal and the processing of the interfering cell can be omitted, and the processing load can be reduced even when the number of layers of the interference signal increases.

Further, an interference state simulating method of a mobile terminal testing device of the present invention is an interference state simulating method of a mobile terminal testing device which includes a layer processing unit that communicates with the mobile terminal according to a communication protocol with a plurality of layers, and tests the mobile terminal by simulating a base station of mobile communication, the method including a step of transmitting a dummy signal generated by omitting higher processing from predetermined processing, for an interference signal in multi user-multi input multi output (MU-MIMO) multiplex signals, in a case of testing MU-MIMO terminal-to-terminal interference.

With this configuration, for the interference signal in MU-MIMO multiplex signals, the dummy signal generated by omitting higher processing from a predetermined processing is transmitted. Thus, the creation of parameters of the interference signal and the processing of the interfering cell can be omitted, and the processing load can be reduced even when the number of layers of the interference signal increases.

Further, the interference state simulating method of a mobile terminal testing device of the present invention may further include a step of setting whether or not to transmit the dummy signal, for each of the MU-MIMO multiplex signals.

With this configuration, it is possible to set whether or not to transmit a dummy signal, for each of the MU-MIMO multiplex signals. Thus, the number of layers of the interference signal can be easily increased or decreased, and the interference state can be easily set.

Further, the interference state simulating method of a mobile terminal testing device of the present invention may further include a step of setting a parameter of processing lower than the omitted processing, for the MU-MIMO multiplex signals which are set to transmit the dummy signal.

With this configuration, a parameter of processing lower than the omitted processing can be set, for the MU-MIMO multiplex signals which are set to transmit the dummy signal. Therefore, the parameters of the signal to be transmitted can be changed and the interference state can be easily set.

Further, in the interference state simulating method of a mobile terminal testing device of the present invention, higher processing from the predetermined processing may be one or a plurality of processing higher than channel coding.

With this configuration, the creation of parameters of the interference signal and the processing of the interfering cell can be omitted, and the processing load can be reduced even when the number of layers of the interference signal increases.

Advantage of the Invention

According to the present invention, it is possible to provide a mobile terminal testing device capable of reducing a processing load even if the number of layers of interference signals increases.

BEST MODE FOR CARRYING OUT THE INVENTION

Hereinafter, a mobile terminal testing device according to an embodiment of the present invention will be described in detail with reference to the drawings.

Figure 1:
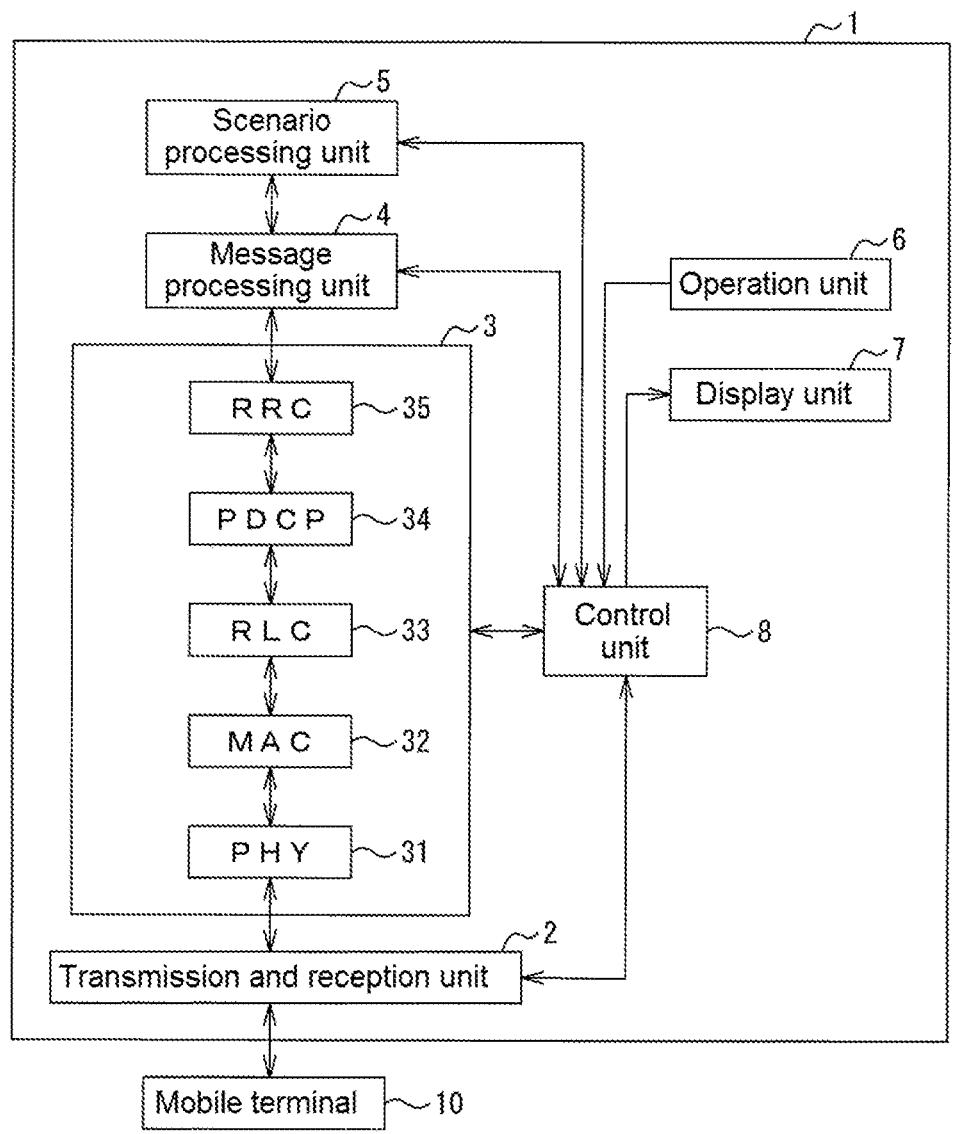
FIG. 1 is a block diagram of a mobile terminal testing device according to an embodiment of the present invention.

In FIG. 1, the mobile terminal testing device 1 according to an embodiment of the present invention as a pseudo base station transmits and receives radio frequency (RF) signals to and from a mobile terminal 10 through a coaxial cable or the like. Further, the mobile terminal testing device 1 may transmit and receive RF signals to and from the mobile terminal 10 through an antenna by radio.

The mobile terminal testing device 1 includes a transmission and reception unit 2, a layer processing unit 3, a message processing unit 4, a scenario processing unit 5, an operation unit 6, a display unit 7, and a control unit 8.

The transmission and reception unit 2 converts the frequency of the output signal of the layer processing unit 3 into an RF band, amplifies the power of the frequency-converted signal, and transmits the power-amplified signal to the mobile terminal 10. When a MIMO test is performed, the transmission and reception unit 2 generates an output signal for each of a plurality of antennas of the mobile terminal 10. Further, the transmission and reception unit 2 converts the frequency of the signal of the RF band transmitted from the mobile terminal 10 into the base band, and outputs the frequency-converted signal to the layer processing unit 3 as a received signal.

Since the layer processing unit 3 performs signal processing based on a predetermined communication protocol, it performs processing of each layer of a layer-configured communication protocol with a plurality of layers.

The layer processing unit 3 includes a PHYsical layer (PHY) processing unit 31, a Medium AccessControl layer (MAC) processing unit 32, a Radio Link Control layer (RLC) processing unit 33, a Packet Data Convergence Protocol layer (PDCP) processing unit 34, and a Radio Resource Control layer (RRC) processing unit 35.

The PHY processing unit 31 modulates and demodulates communication data transmitted to and received from the mobile terminal 10. Since the PHY processing unit 31 performs multiplexing, channel coding or the like in order to transmit and receive communication data.

The MAC processing unit 32 performs control for efficiently using radio resources, and performs data conversion between the PHY processing unit 31 which is a lower layer and the RLC processing unit 33, the PDCP processing unit 34, and the RRC processing unit 35, which are higher layers.

The RLC processing unit 33 performs processing such as flow control, processing of error data, and data retransmission between the mobile terminal 10 and mobile terminal testing device 1.

The PDCP processing unit 34 performs secrecy, validity confirmation, order alignment, header compression, or the like. The RRC processing unit 35 sets up a radio bearer which is a virtual connection established in a radio section between the mobile terminal 10 and mobile terminal testing device 1, and reports system information and call information to the mobile terminal 10.

Under the control from the scenario processing unit 5, the message processing unit 4 generates a message to be transmitted to the mobile terminal 10 and sends it to the layer processing unit 3, and processes the message received from the mobile terminal 10 through the layer processing unit 3.

The scenario processing unit 5 controls the message processing unit 4 in order to execute each procedure of a test according to a test scenario in which setting and test procedures of the mobile terminal testing device 1 are described.

The operation unit 6 is input devices such as a keyboard, a mouse, and a touch panel, and outputs operation-input information necessary for generating a scenario to the control unit 8. The display unit 7 is an image display device such as a liquid crystal display, and displays an image for inputting information necessary for generating a scenario and an image showing a state under test.

The control unit 8 displays a test scenario creation screen on the display unit 7 according to an instruction input on the operation unit 6 to input information necessary for creating a test scenario, or creates the test scenario based on the information input by the operation unit 6 on the test scenario creation screen. Further, the control unit 8 transmits an instruction to the scenario processing unit 5 according to the instruction input to the operation unit 6 to execute a test based on the test scenario stored in the storage device, or displays the state under test on the display unit 7, based on information on the state of each layer of the layer processing unit 3 and the state of communication with the mobile terminal 10 transmitted from the scenario processing unit 5 or the like.

Here, the mobile terminal testing device 1 is constituted of a computer device (not shown) provided with a communication module for communicating with the mobile terminal 10. The computer system includes a central processing unit (CPU), a read only memory (ROM), a random access memory (RAM), a hard disk device, an input/output port, and a touch panel, which are not shown.

A program for making a computer device function as a mobile terminal testing device 1 is stored in a ROM and a hard disk device of the computer device. That is, the CPU executes the program stored in the ROM with the RAM as a work area, and the computer device functions as the mobile terminal testing device 1.

Thus, in the present embodiment, the message processing unit 4, the scenario processing unit 5, and the control unit 8 are the CPU, and the transmission and reception unit 2, and the layer processing unit 3 are the communication module.

In the MIMO in the LTE-A, a unique Reference Signal is assigned to each antenna port in order to separately receive spatial multiplexed signals. In addition to spatial multiplexing with this Reference Signal, signal multiplexing is also performed by code regions using scrambling identity (nSCID). Further, in the LTE-A, the combination of spatial multiplexing and code multiplexing by scrambling identity is selectively used according to the type of signal, and efficient data transmission is enabled. Therefore, the number of layers that can be multiplexed in the LTE-A is determined by spatial multiplexing determined by the number of physical antennas and code multiplexing determined by the number of scrambling identities.

In a test of MU-MIMO terminal-to-terminal interference, signals for the mobile terminal 10 to be tested are mapped to some of the layers to be multiplexed (also referred to as spatial multiplexing layers) described above, and interference signals are mapped to other layers.

In the present embodiment, by focusing on the signal processing and testing purposes of LTE-A, instead of a signal generated by performing processing of all protocols of LTE, a dummy signal generated with simplified processing is used as an interference signal of MU-MIMO.

Figure 2:
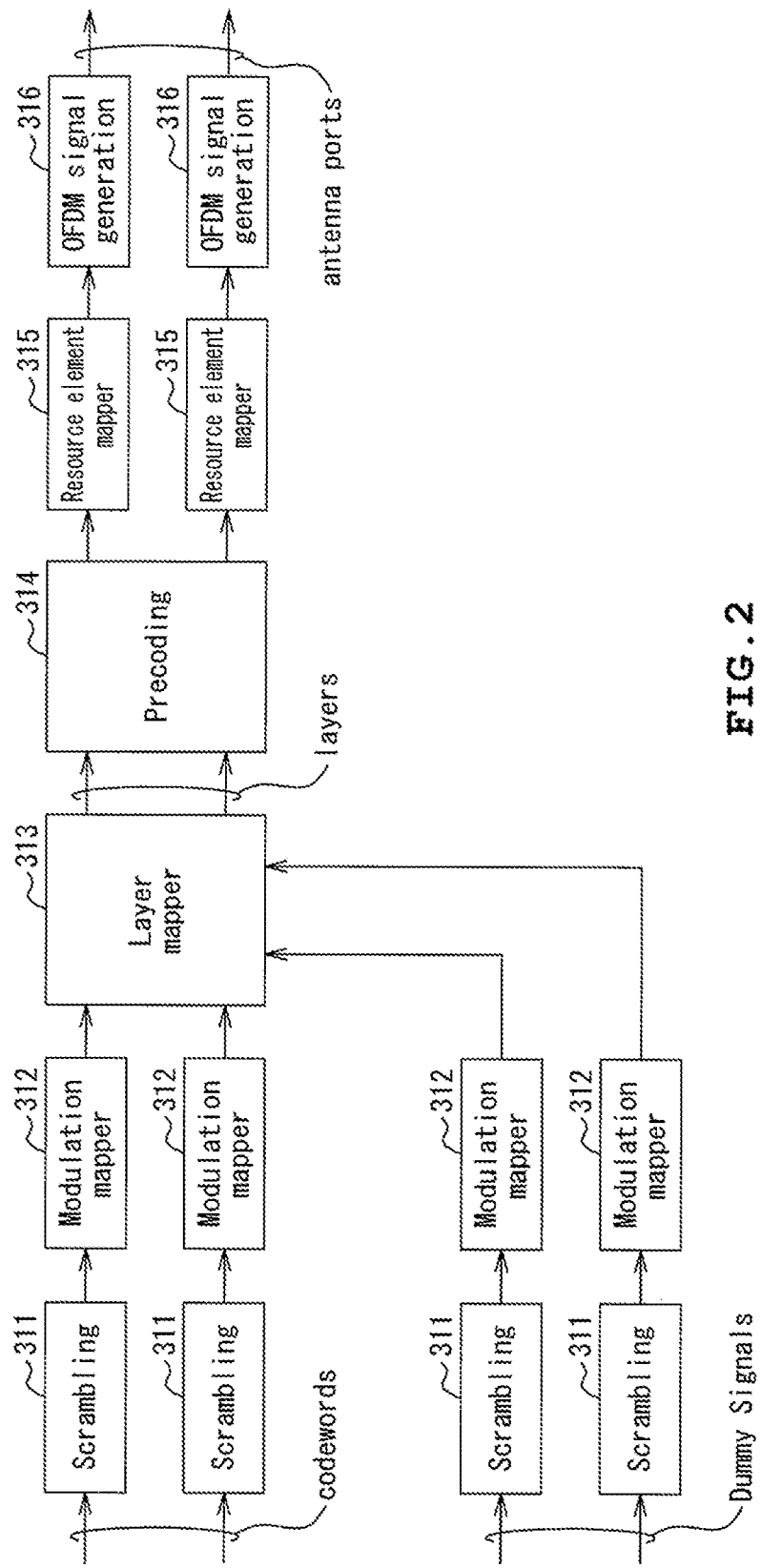
FIG. 2 is a physical channel control block diagram of a PHY processing unit of the mobile terminal testing device according to the embodiment of the present invention.

The PHY processing unit 31 includes, as shown in FIG. 2, a scrambling unit 311, a modulation mapper 312, a layer mapper 313, a precoding unit 314, a resource element mapper 315, and an OFDM signal generation unit 316.

The scrambling unit 311 scrambles a codeword (indicated by "codewords" in FIG. 2) which is data for the mobile terminal 10 to be tested or a dummy signal (indicated by "Dummy Signals" in FIG. 2) which is data of an interference signal.

The modulation mapper 312 maps the scrambled data to modulation symbols. The layer mapper 313 maps modulation symbols to one or a plurality of layers. The precoding unit 314 multiplies the layer signal by a precoder matrix to weight and distribute the resulting signal to the antenna port.

The resource element mapper 315 maps a signal for each antenna port to a resource element assigned by a scheduler. The OFDM signal generation unit 316 generates an Orthogonal Frequency Division Multiplexing (OFDM) signal of each antenna port from a signal mapped to a resource element.

The control unit 8 generates a dummy signal in a preset layer on the basis of a preset parameter, inputs the dummy signal to the scrambling unit 311 corresponding to the layer by the PHY processing unit 31 to simulate an interference state of MU-MIMO.

For example, the control unit 8 enables the setting of the dummy signal on the test scenario creation screen displayed on the display unit 7 according to the instruction input to the operation unit 6.

The control unit 8 enables setting of parameters for each layer by the number of antenna ports and the number of scrambling identities. For example, in a case of eight physical antennas, the following eight layers are provided.

1. antenna port 7 (nSCID=0)
2. antenna port 8 (nSCID=0)
3. antenna port 11 (nSCID=0)
4. antenna port 13 (nSCID=0)
5. antenna port 7 (nSCID=1)
6. antenna port 8 (nSCID=1)
7. antenna port 11 (nSCID=1)
8. antenna port 13 (nSCID=1)

The control unit 8 sets the following parameters for each layer.

Sending or not sending dummy signal
Precoding information
UEID
Modulation Scheme In MIMO, adjusting the amplitude and phase in advance on the transmission side such that multiplexed information can be easily separated and demodulated on the reception side is called Precoding. The Precoding information is the amount of adjustment of the amplitude and the phase.

The UEID is a unique ID for identifying an individual terminal (UE) on a communication network.

Modulation Scheme is Quadrature Phase Shift Keying (QPSK), 16 Quadrature Amplitude Modulation (QAM), 64QAM, or the like. According to this modulation scheme, digital data is added as information to the amplitude and phase of the radio wave.

These parameters may be increased or decreased depending on the simulated interference state or testing purpose.

The control unit 8 generates a dummy signal for a layer set to transmit the dummy signal on the basis of such parameters, and stores the dummy signal and the set parameter in association with the information of the layer.

The PHY processing unit 31 refers to the information of the layer, and performs setting according to the set parameters in a case where a layer is set to transmit the dummy signal, and inputs and processes the dummy signal corresponding to the scrambling unit 311. The PHY processing unit 31 does not input a dummy signal to the scrambling unit 311 corresponding to a layer set not to transmit the dummy signal.

As described above, in the processing of layers of the interference signal, processing higher than the scrambling unit 311 is omitted, so the setting of parameters or signal processing of the omitted part may not be performed, and a processing load can be reduced.

Figure 3:
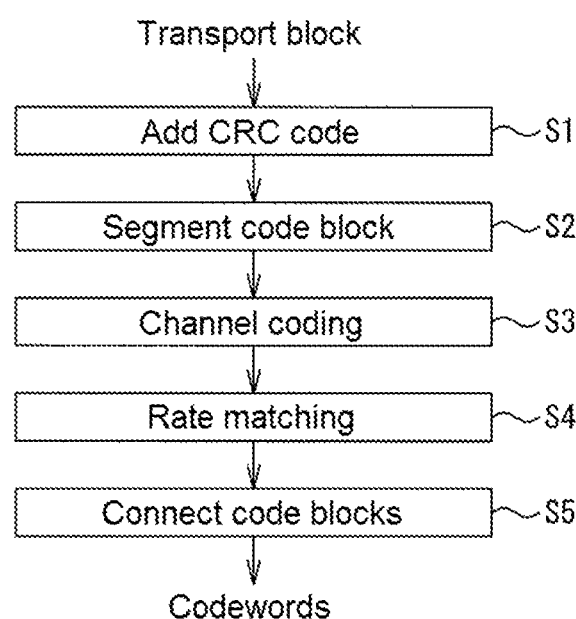
FIG. 3 is a flow chart explaining a codeword generation processing procedure of the PHY processing unit of the mobile terminal testing device according to the embodiment of the present invention.

The processing higher than the scrambling unit 311 is the processing shown in FIG. 3. In step S1, the PHY processing unit 31 adds a Cyclic Redundancy Check (CRC) code to a transport block input from the MAC processing unit 32.

In step S2, the PHY processing unit 31 segments a code block to which a CRC code is added.

In step S3, the PHY processing unit 31 performs channel coding of the segmented code block.

In step S4, the PHY processing unit 31 performs rate matching on the channel-coded code block.

In step S5, the PHY processing unit 31 connects code blocks subjected to rate matching, generates codewords, and outputs it to the scrambling unit 311 shown in FIG. 2.

In the present embodiment, such processing can be omitted for the layer of the interference signal. In particular, since the processing of channel coding in step S3 and the processing of segmentation in step S2 have heavy load, the effect is high by omitting higher processing including at least the channel coding.

Further, since the processing load can be reduced even if the layer of the interference signal is increased, it is possible to quickly cope with the higher order of the MU-MIMO.

Further, since the layer of the interference signal can be generated without a large change from the configuration in the related art, cost can be reduced.

Further, since the number of layers of the interference signal and the parameters of the signal to be transmitted can be changed by setting the parameter, the interference state can be easily set.

Although embodiments of the present invention have been disclosed, it will be apparent to those skilled in the art that modifications may be made without departing from the scope of the invention. All such modifications and equivalents are intended to be included in the following claims.

DESCRIPTION OF REFERENCE NUMERALS AND SIGNS

1 mobile terminal testing device
3 layer processing unit
31 PHY processing unit
32 MAC processing unit
33 RLC processing unit
34 PDCP processing unit
35 RRC processing unit
311 scrambling unit
312 modulation mapper
313 layer mapper
314 precoding unit
315 resource element mapper
316 OFDM signal generation unit

What is claimed is:

1. A mobile terminal testing device which tests a mobile terminal by simulating a base station of mobile communication, comprising:
    processor that communicates with the mobile terminal according to a communication protocol with a plurality of layers,
    wherein the processor transmits a dummy signal generated by omitting higher processing from predetermined processing, for an interference signal in multi user-multi input multi output (MU-MIMO) multiplex signals, in a case of testing MU-MIMO terminal-to-terminal interference.

2. The mobile terminal testing device according to claim 1,
    wherein the processor sets whether or not to transmit the dummy signal, for each of the MU-MIMO multiplex signals.

3. The mobile terminal testing device according to claim 2,
    wherein the processor sets a parameter of processing lower than the omitted processing, for the MU-MIMO multiplex signals which are set to transmit the dummy signal.

4. The mobile terminal testing device according to claim 1,
    wherein the higher processing from the predetermined processing is one or a plurality of processing higher than channel coding.

5. An interference state simulating method of a mobile terminal testing device comprising: a processor that communicates with a mobile terminal according to a communication protocol with a plurality of layers, and tests the mobile terminal by simulating a base station of mobile communication, the method comprising:
    a step of transmitting a dummy signal generated by omitting higher processing from predetermined processing, for an interference signal in multi user-multi input multi output (MU-MIMO) multiplex signals, in a case of testing MU-MIMO terminal-to-terminal interference.

6. The interference state simulating method according to claim 5, further comprising:
    a step of setting whether or not to transmit the dummy signal, for each of the MU-MIMO multiplex signals.

7. The interference state simulating method according to claim 5, further comprising:
    a step of setting a parameter of processing lower than the omitted processing, for the MU-MIMO multiplex signals which are set to transmit the dummy signal.

8. The interference state simulating method according to claim 5,
    wherein the higher processing from the predetermined processing is one or a plurality of processing higher than channel coding.

\* \* \* \* \*